United States Patent [19]

Hansson et al.

[11] Patent Number: 4,507,854
[45] Date of Patent: Apr. 2, 1985

[54] METHOD OF MANUFACTURING TEMPERATURE-SENSITIVE INSTRUMENTS

[75] Inventors: Ingvar J. M. Hansson, Staffanstorp; Håkan B. Håkansson, Lund; Magnus °G. K. Igefjord; Berth-Ove G. Wall, both of Bjärred, all of Sweden

[73] Assignee: Gambro Crafon AB, Sweden

[21] Appl. No.: 447,176

[22] Filed: Dec. 6, 1982

Related U.S. Application Data

[62] Division of Ser. No. 196,079, filed as a PCT SE 79/00018, Jan. 25, 1979, published as WO 80/01608, Aug. 7, 1980, § 102(e), dated Jun. 1, 1979, Pat. No. 4,382,246.

[51] Int. Cl.³ ............................................. H01C 7/00
[52] U.S. Cl. ...................................... 29/612; 29/411; 156/292; 374/208
[58] Field of Search .................... 29/612, 613, 411; 338/22 R, 25, 26, 28, 30; 374/185, 183, 208; 156/292, 256, 64, 269

[56] References Cited

U.S. PATENT DOCUMENTS

| | | | |
|---|---|---|---|
| 2,654,818 | 10/1953 | Whitehead | 29/612 |
| 2,703,833 | 3/1955 | Vanvor | 338/28 |
| 2,952,761 | 9/1960 | Smith-Johannsen | 331/314 |
| 3,028,756 | 4/1962 | Takagishi | 374/172 |
| 3,077,511 | 2/1963 | Bohrek et al. | 339/17 F |
| 3,109,227 | 11/1963 | Goodyear | 338/8 |
| 3,110,088 | 11/1963 | Blom | 29/612 |
| 3,189,863 | 6/1965 | Leach | 339/17 F |
| 3,246,385 | 4/1966 | King | 29/613 |
| 3,393,392 | 7/1968 | Shelley | 339/176 MF |
| 3,603,150 | 9/1971 | Kurtin et al. | 29/612 |
| 3,646,494 | 2/1972 | Waseleski et al. | 338/25 |
| 3,673,538 | 6/1972 | Faxon | 338/25 |
| 3,684,996 | 8/1972 | Schwarz | 338/22 |
| 3,697,925 | 10/1972 | Henschen | 339/176 MF |
| 3,750,471 | 8/1973 | Bremer | 128/736 |
| 3,889,362 | 6/1975 | Tyler | 29/619 |
| 4,251,712 | 2/1981 | Parr | 338/314 |
| 4,302,972 | 12/1981 | Oettle et al. | 374/172 |
| 4,317,367 | 3/1982 | Schonberger | 374/165 |

FOREIGN PATENT DOCUMENTS

| | | |
|---|---|---|
| 2261531 | 6/1973 | Fed. Rep. of Germany . |
| 2060610 | 6/1973 | Fed. Rep. of Germany . |
| 2105486 | 4/1972 | France . |
| 7863046 | 3/1978 | Sweden ........ 338/28 |
| 113427 | 12/1956 | U.S.S.R. . |

Primary Examiner—Howard N. Goldberg
Assistant Examiner—P. W. Echols
Attorney, Agent, or Firm—Lerner, David, Littenberg, Krumholz & Mentlik

[57] ABSTRACT

A method of manufacturing temperature-sensitive instruments includes supplying first and second webs of insulating material in synchronism with each other to a work station, the first web having a series of first holes formed therein offset from a series of second holes formed in the second web. An electrical conductor is disposed transversely between the first and second webs such that the conductor forms pairs of conducting lines, one line of each pair being in register with a corresponding one of the first holes and the other line of each pair being in register with a corresponding one of the second holes. After connecting each pair of connecting lines to a temperature-sensitive sensor, the first and second webs are cut at spaced intervals between adjacent pairs of conducting lines to form a plurality of temperature-sensitive instruments.

11 Claims, 6 Drawing Figures

Fig. 1    Fig. 2    Fig. 3
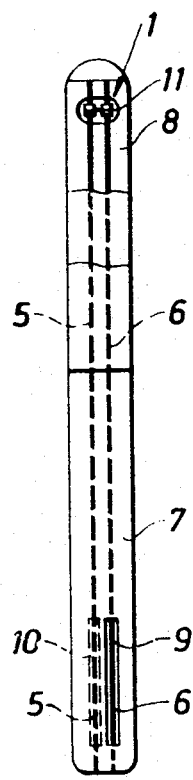
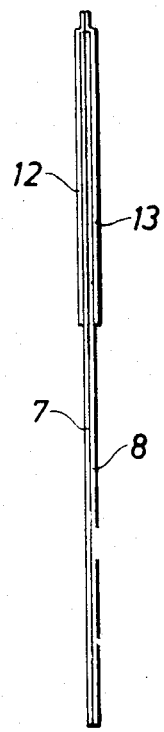
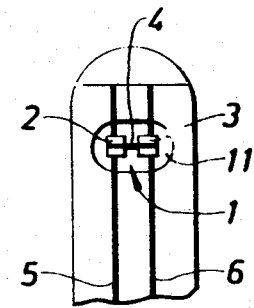
Fig. 4
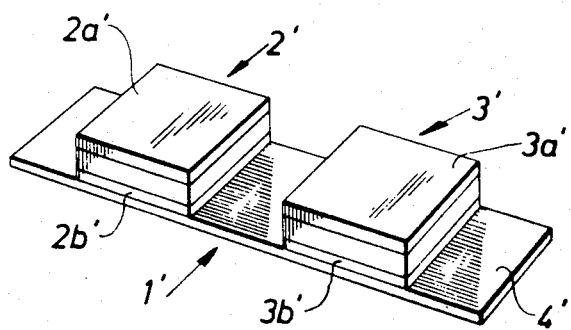

METHOD OF MANUFACTURING TEMPERATURE-SENSITIVE INSTRUMENTS

This is a division of application Ser. No. 196,079, filed as a PCT SE 79/00018, Jan. 25, 1979, published as WO 80/01608 Aug. 7, 1980, § 102 date Jun 1, 1979, Pat. No. 4,382,246.

TECHNICAL FIELD

The present invention relates to an apparatus for measuring temperature, comprising a temperature-sensitive sensor, whose electric properties, for example, resistance, vary with the temperature, for example, a thermistor which is connected to electric lines which, in turn, may be connected to a read-off unit for reading off the values of current, voltage or the like corresponding to the temperature.

The apparatus according to the invention is primarily intended to be used for medicinal temperature measurement. Consequently, one aspect of the invention is to make the apparatus so simple and cheap that it may be disposed of after use, that is to say that it may not be reused.

At the same time however, it should be possible to manufacture the apparatus with such precision that the reader can rely with great certainty on the read-off values, this being, clearly, of the greatest importance precisely in medical use.

However, it is clear to a person skilled in the art that the apparatus according to the invention may be used in other contexts, for example, in pure industrial application in which a simple and inexpensive but nevertheless reliable reading-off of temperature is desired.

BACKGROUND ART

Swedish Patent Application 78.03046-7 (U.S. Ser. No. 779,152) filed Mar. 18, 1977, which is the parent of U.S. patent application Ser. No. 41,551, filed May 23, 1979, now U.S. Pat. No. 4,317,367, and the two copending PCT Applications PCT/SE78/00012 (U.S. application Ser. No. 131,079, filed July 3, 1978, now U.S. Pat. No. 4,296,633) and PCT/SE 76/00013 (U.S. patent application Ser. No. 131,078, filed June 1, 1979, now U.S. Pat. No. 4,253,334) describe different embodiments of an apparatus similar to that according to the invention and how the apparatus according to the invention may be used. The concept forming the basis of the present invention is, in this instance, to realize such an apparatus, but of simpler type and adapted to a simpler manner of manufacture.

In U.S. patent applications Ser. No. 787,422, filed Apr. 14, 1977, now U.S. Pat. No. 4,200,970 and Ser. No. 879,193, filed Feb. 21, 1978, there are described different trimming processes for apparatuses similar to that according to the invention. Such trimming processes could well be used for trimming the apparatus according to the invention. Preferably however, use is made instead of an assortment of the type described in co-filed application PCT/SE78/00012 (U.S. patent application Ser. No. 131,079, filed July 3, 1978, now U.S. Pat. No. 4,296,633).

DESCRIPTION OF THE INVENTION

The apparatus constructed in accordance with the invention is characterized in that the above-mentioned electric lines are disposed between two insulated layers which display mutually offset holes in register with each respective line, whereby these may easily be connected to different sensing terminals in the above-mentioned read-off unit.

In accordance with the present invention, such temperature-sensitive instruments can be mass produced by supplying first and second webs of insulated material in synchronism with each other to a work station, the first web having a series of first holes formed therein offset from a series of second holes formed in the second web. An electrical conductor is disposed transversely between the first and second webs such that the conductor forms pairs of conducting lines, one line of each pair being in register with a corresponding one of the first holes and the other line of each pair being in register with a corresponding one of the second holes. Each pair of conducting lines is attached to a temperature-sensitive sensor. By cutting the first and second webs at spaced intervals between adjacent pairs of conducting lines, a plurality of temperature-sensitive instruments may be produced quickly and efficiently.

Preferably, the two insulated webs or layers consist of plastics-coated paper which may easily be thermally sealed to mutually contact each other and, respectively, to contact with other materials.

In order to increase the possibilities of rapid read-off, the two insulating webs or layers present holes suitably located in register with each other and in register with the sensor. In order, in such an event, to prevent short-circuiting when the apparatus is used in web or humid atmosphere, for example, in the mouth of a patient, the sensor and the hole in register therewith are covered by two insulating outer layers which do not, however, cover the mutually offset holes.

The sensor which is used may consist of two thermistors which are each connected by their first terminal to an intermediate line and are each connected by their second terminal to the above-mentioned electric line. As a result, the thermistors which are used need not be trimmed. Instead, it is possible, by selection, to choose two thermistors which, in the correct coupling, give the desired value of the electric property which is used for measuring the temperatures.

At the same time, handling of the thermistors (which normally are very small) is facilitated. The above-mentioned intermediate line may, for example, consist of a short strip of copper foil or other similar electrically-conductive material. Two such thermistors fixedly retained on one such copper foil are, in this case, easier to handle than separate thermistors.

The apparatus according to the invention is suitably designed in elongate form. The two electric lines may, in this case, be of substantially the same length as the two elongate insulating layers between which they are located. In such an event, the sensor is placed close to one end, whereas the mutually offset holes are placed proximal to the opposite end of the insulating layer. This arrangement makes it possible that the non-insulated lines may be grasped by the above-mentioned read-off unit, while the sensor is still located in the mouth of a patient.

As a read-off unit, use may be made, for example, of one of those described in copending PCT Application PCT/SE78/00013, (U.S. patent application Ser. No. 131,078, filed June 1, 1979 now U.S. Pat. No. 4,253,334), whose contents are herewith incorporated in the present application.

The insulating outer layers may also, suitably, be of plastics-coated paper or other liquid-tight flexible material. They can, in this context, extend out over one end of the two elongate insulating layers so that they also insulate the ends of the lines located therebetween. This end of the apparatus, that is to say that at which the sensor is located, may be rounded-off without exposing the electric lines. If, at the same time, the materials for the above-mentioned lines, insulating layers and outer layers are selected such that high flexibility is imparted to the apparatus in its entirety, the apparatus will be particularly suited for temperature measurement in, for example, the mouth where such properties are required.

By using plastics-coated paper for both the inner, insulating layers and the outer, insulating layers, the two inner layers may be mutually combined, both between and outside the electric lines disposed in parallel, at the same time as the insulating outer layers may be combined, on the one hand mutually and on the other hand with the two inner, insulating layers.

BRIEF DESCRIPTION OF THE DRAWINGS

FIG. 1 shows a preferred embodiment of the apparatus according to the invention, certain parts of the different material layers having been removed.

FIG. 2 is a side elevation of the same apparatus.

FIG. 3 is an enlargement of the forward end of the apparatus.

FIG. 4 shows an alternative embodiment of the sensor which is used in the apparatus according to FIGS. 1–3.

PREFERRED EMBODIMENT OF THE INVENTION

Figure 5:
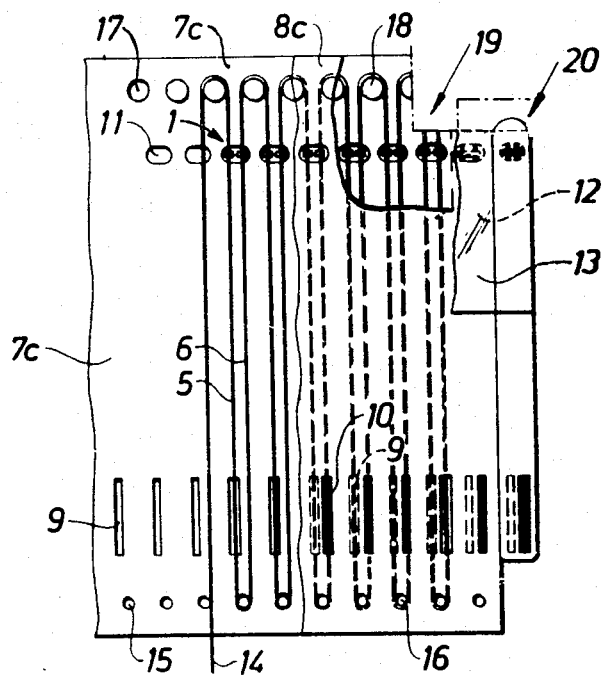
FIG. 5 is intended to illustrate a simple method for realizing the apparatus shown in FIGS. 1–3.

The apparatus shown as an example comprises, thus, a temperature-sensitive sensor which is designated in its entirety with 1 in FIGS. 1 and 3, and 1', respectively, in FIG. 4. This sensor consists, according to FIGS. 1–3 of two thermistors 2 and 3 which are interconnected via an intermediate line 4. In FIG. 4, the thermistors are, instead, designated 2' and 3', respectively, whereas the intermediate line consists of a copper foil which is designated 4'. The terminals of the one thermistor are, here, designated 2a' and 2b', whereas the terminals of the second thermistor are designated 3a' and 3b'.

Furthermore, the two thermistors 2 and 3 are connected to electric lines 5 and 6, respectively. In the embodiment according to FIG. 4, the corresponding line is connected to the terminals 2a' and 3a'.

The two electric lines 5 and 6 are encapsulated between two inner, insulating layers 7 and 8 which present mutually offset holes 9, 10, respectively, each in register with their respective lines 6, 5, respectively. As a result, these two lines 6 and 5 are exposed through the holes 9 and 10. More particularly, the opening 9 extends through the insulating layer 7 to expose the conductor 6 for the purpose of permitting electrical contact therewith from one side of the apparatus, while the opening 10 extends through the insulating layer 8 to expose the conductor 5 for the purpose of permitting electrical contact therewith from an opposite side of the apparatus. Because the openings 9, 10 are offset, the conductors 5, 6 can be engaged from opposite sides of the apparatus by a temperature reading unit (not shown) adapted to receive from the conductors 5, 6 electrical signals representing a temperature sensed by the sensor 1 and to convert the signals into a readable temperature value. The temperature reading unit can be similar to the one disclosed in U.S. Pat. No. 4,253,334, whose contents have already been incorporated herein by reference thereto.

The two insulating layers 7 and 8 consist suitably of plastics-coated paper, which facilitate manufacture, since the thermal sealing may be used to unite the two layers which each other and with other materials. At the same time, use of the apparatus according to the invention is made possible in a humid environment.

The two insulating layers 7 and 8 present, furthermore, holes 11 located in register with each other and with the sensor.

The sensor 1 and the holes 11 located in register therewith are covered by two insulating, outer layers 12 and 13. These outer layers are provided only along the forward end of the apparatus and, thus, do not cover the holes 9 and 10. As is most clearly apparent from FIG. 1, the two electric lines 5 and 6 are substantially of the same length as the two elongate, insulating layers 7 and 8, between which they are located, the sensor 1 being located proximal to one end which, as above and in the following discussion, will be designated as the forward end of the apparatus, whereas the mutually offset holes 9 and 10 are located proximal to the opposite end of the insulating layers.

The two insulating, outer layers 12 and 13 extend out over the forward end of the two inner, insulating layers, such that they also insulate the ends of the lines 5 and 6 located therebetween. As a result, this forward end may be rounded-off without exposing the lines.

PREFERRED MANNER OF MANUFACTURE

Figure 6:
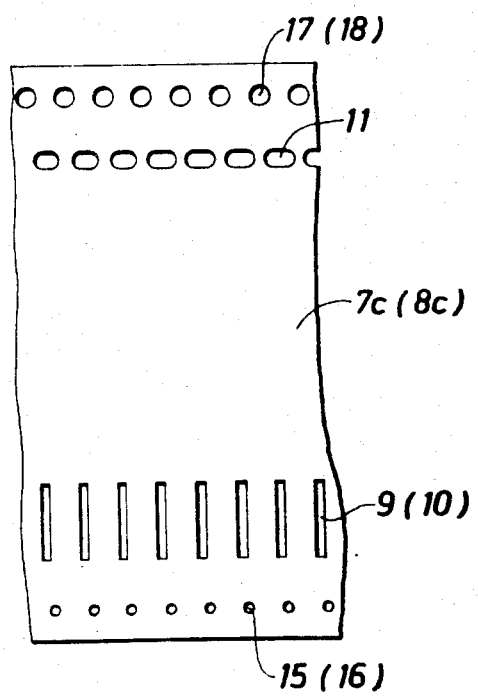
FIG. 6 shows, finally, one of the material layers used in the realization according to FIG. 5.

The apparatus according to the invention is suitably manufactured in the manner which is illustrated in greater detail by FIGS. 5 and 6. A conducting means 14, for example a thin copper wire, is led in zig-zag formation between two paper webs 7c and 8c.

The webs 7c, 8c include punched holes 15, 17 and 16, 18, respectively, and are synchronously driven by members entering these holes, such as driving sprockets, pins, etc., mounted on a drum (not shown) or the like. In the preferred embodiment, the pins entering holes 17 and 18 are larger than the pins entering holes 15 and 16 so as to control the spacing between lines 5 and 6. That is, the smaller pins produce a reduced space between lines 5 and 6 for each unit to be formed, whereas the larger pins produce a larger space between the lines 5 and 6 of one unit and an adjacent unit. Also, in the preferred embodiment, the paper webs 7c, 8c are heat sealed together and thereby maintain the lines 5 and 6 in position between the paper webs. In addition, the web 7c includes a hole 9 formed therein, and the web 8c includes a hole 10 formed therein, and as a result of the synchronous driving of the webs, holes 9 and 10 are mutually offset from each other so that hole 9 is in register with line 5 and hole 10 is in register with line 6. Both of the webs are provided with holes 11 which, as a result of the synchronous advancement, will be located in register with each other. In register with these holes 11, the lines 5 and 6 formed by the wire 14 will also be exposed, to which lines the sensor 1 is connected by soldering or the like. Thereafter, the two outer strip portions of the webs 7c and 8c with the holes 15, 16, 17 and 18 may be cut off. This is intimated at the arrow 19. Thereafter, the outer layers 12 and 13 are applied, which also suitably is effected in the form of two webs.

For the sake of simplicity however, no such complete webs are shown in FIG. 5. Finally, the forward end of the apparatus is rounded-off by punching, this suitably being effected in conjunction with the punching-out in its entirety of the apparatus from the produced material web.

FIG. 5 illustrates the manner of manufacture, naturally schematically, in a highly concentrated state. In practice, the various manufacturing operations are effected by means of different devices in completely separate processes, for example, in separate stations along a material web of greater length, this being constructed gradually.

Finally, FIG. 6 shows a material web which may constitute one of the material webs 7c and 8c, which differ from each other only through the location of the holes 9 and 10, respectively. The holes 17 and 18, and 15 and 16, respectively are, thus, identical, at the same time as both webs contain holes 11.

Naturally, the invention is not restricted only to the above-described embodiment, but may be varied within the spirit and scope of the appended claims. For example, the plastics-coated paper layers 7 and 8 may be replaced by layers of waxed paper with, for example, a hotmelt coating on one side for the purposes of unification. Alternatively, they may be replaced by normal paper without moisture insulation, since this may be provided by means of the outer layers 12 and 13. The sealing may, in this case, be realized with the assistance of hotmelt, adhesive or other suitable binder.

We claim:

1. A method of manufacturing temperature-sensitive instruments, comprising the steps of:
   supplying first and second webs of insulated material in synchronism with each other to a work station, said first web having a series of first holes formed therein offset from a series of second holes formed in said second web;
   disposing a conductor transversely between said first and second webs such that said conductor forms pairs of conducting lines, one line of each pair being in register with a corresponding one of said first holes and the other line of each pair being in register with a corresponding one of said second holes;
   connecting a temperature-sensitive sensor to each of said pairs of conducting lines; and
   cutting said first and second webs at spaced intervals between adjacent pairs of conducting lines to form a plurality of temperature-sensitive instruments.

2. The method of claim 1, further including the step of heat sealing said first and second webs together to maintain said conducting lines in position relative to said first and second holes.

3. The method of claim 1, further including the steps of forming a series of third and fourth holes in register with each other in said first and second webs, respectively, and disposing said conductor between said first and second webs such that each pair of conducting lines is in register with a corresponding one of said third holes and with a corresponding one of said fourth holes.

4. The method of claim 3, wherein the step of connecting said sensor includes connecting said sensor to the portion of said conducting lines in register with said third and fourth holes.

5. The method of claim 1, further including the step of overlapping said first and second webs with third and fourth webs formed of insulating material such that said third and fourth webs no not overlap said first and second holes.

6. The method of claim 1, wherein the step of disposing said conductor includes the step of spacing adjacent pairs of conducting lines further apart than the space between the conducting lines which form said pairs of conducting lines.

7. The method of claim 1, further including the steps of forming a first set of driving holes along a first edge of each of said first and second webs and forming a second set of driving holes along a second edge of each of said first and second webs, whereby said first and second webs can be synchronously driven by first and second driving means entering said first and second driving holes, respectively.

8. The method of claim 7, wherein the step of disposing said conductor includes drawing said conductor about said first and second driving means.

9. The method of claim 8, wherein said first driving holes are larger than said second driving holes, whereby said first and second driving means may be used to automatically space adjacent pairs of conducting lines further apart than the spacing between the conducting lines which form said pairs of conducting lines.

10. The method of claim 8, wherein said pairs of conductors are provided by disposing a single electrical conducting element between said first and second webs in a serpentine pattern.

11. The method of claim 1, wherein said sensor includes two thermistors, each having first and second terminals, and the step of connecting said sensor includes the step of connecting said first terminals to each other and connecting said second terminals to respective lines of said pairs of conducting lines.

* * * * *

UNITED STATES PATENT AND TRADEMARK OFFICE
CERTIFICATE OF CORRECTION

PATENT NO. : 4,507,854
DATED : April 2, 1985
INVENTOR(S) : HANSSON ET AL.

It is certified that error appears in the above-identified patent and that said Letters Patent is hereby corrected as shown below:

Column 1, line 43, change "SE76/" to --SE78/--; and

Column 2, line 29, change "web" to --wet--.

Signed and Sealed this

Twentieth Day of August 1985

[SEAL]

Attest:

DONALD J. QUIGG

Attesting Officer

Acting Commissioner of Patents and Trademarks